United States Patent
Miecznik et al.

(10) Patent No.: US 9,336,441 B2
(45) Date of Patent: May 10, 2016

(54) BATHYMETRIC TECHNIQUES USING SATELLITE IMAGERY

(71) Applicant: DigitalGlobe, Inc., Longmont, CO (US)

(72) Inventors: Grzegorz Miecznik, Erie, CO (US); Brett W. Bader, Lyons, CO (US)

(73) Assignee: DigitalGlobe, Inc., Longmont, CO (US)

( * ) Notice: Subject to any disclaimer, the term of this patent is extended or adjusted under 35 U.S.C. 154(b) by 0 days.

(21) Appl. No.: 14/340,389

(22) Filed: Jul. 24, 2014

(65) Prior Publication Data

US 2015/0248576 A1    Sep. 3, 2015

Related U.S. Application Data

(60) Provisional application No. 61/857,986, filed on Jul. 24, 2013.

(51) Int. Cl.

| | | |
|---|---|---|
| *G06K 9/00* | (2006.01) | |
| *G01C 13/00* | (2006.01) | |
| *G01S 11/12* | (2006.01) | |
| *G01F 23/292* | (2006.01) | |
| *G06T 7/00* | (2006.01) | |
| *G06T 11/60* | (2006.01) | |
| *G01F 23/00* | (2006.01) | |

(52) U.S. Cl.
CPC ............ *G06K 9/0063* (2013.01); *G01C 13/008* (2013.01); *G01F 23/0061* (2013.01); *G01F 23/292* (2013.01); *G01S 11/12* (2013.01); *G06T 7/0051* (2013.01); *G06T 11/60* (2013.01); *G06T 2207/10028* (2013.01); *G06T 2207/10036* (2013.01); *G06T 2207/30181* (2013.01)

(58) Field of Classification Search
USPC ................ 382/106, 109, 154, 195, 209, 286; 367/119, 124
See application file for complete search history.

(56) References Cited

U.S. PATENT DOCUMENTS

| | | | |
|---|---|---|---|
| 5,381,338 A | 1/1995 | Wysocki et al. | |
| 5,528,493 A | 6/1996 | Potter | |
| 5,665,909 A * | 9/1997 | Doherty | G01N 1/12 73/170.29 |
| 6,563,452 B1 * | 5/2003 | Zheng | G01S 7/003 342/195 |
| 7,369,229 B2 * | 5/2008 | Bissett, III | G01J 3/28 356/305 |
| 7,395,157 B2 * | 7/2008 | Feyen | G08B 31/00 702/2 |
| 7,434,446 B2 * | 10/2008 | Johnson | B01D 19/0031 73/19.05 |
| 7,474,334 B1 * | 1/2009 | Patterson | G06K 9/0063 348/207.99 |
| 7,869,620 B2 * | 1/2011 | Thyagarajan | G06K 9/3241 348/81 |
| 7,901,580 B2 * | 3/2011 | Salyer | B01D 5/0024 20/10 |
| 8,583,300 B2 * | 11/2013 | Oehlgrien | B63B 39/061 114/275 |
| 8,670,030 B2 * | 3/2014 | Tanaka | G01S 19/49 348/136 |
| 2005/0151965 A1 | 7/2005 | Bissett, III et al. | |
| 2006/0235616 A1 | 10/2006 | Gallegos et al. | |
| 2012/0020527 A1 | 1/2012 | Abileah | |

OTHER PUBLICATIONS

International Search Report PCT/US2014/048074, Nov. 27, 2014.

\* cited by examiner

*Primary Examiner* — Yosef Kassa
(74) *Attorney, Agent, or Firm* — Robert G. Crouch; Marsh Fischmann & Breyfogle LLP

(57) ABSTRACT

Techniques for improving overhead image bathymetry include obtaining depth information from image data based on one or more of the spectral domain, the angular domain (e.g., stereo or photogrammetry), the temporal domain (e.g., monitoring the movement of waves in a body of water), or any other suitable domain, together with a priori information about the area of interest. These different pieces of depth information from the various different domains are combined together using any combination of Optimal Estimation and Continuity Constraints to improve the accuracy of the results.

20 Claims, 6 Drawing Sheets

BATHYMETRIC TECHNIQUES USING SATELLITE IMAGERY

CROSS-REFERENCE TO RELATED APPLICATIONS

This application claims the benefit of priority of U.S. Patent App. No. 61/857,986, entitled "BATHYMETRIC TECHNIQUES USING SATELLITE IMAGERY," and filed on Jul. 24, 2013, the entire contents of which are incorporated herein by reference as if set forth in full.

BACKGROUND

The use of satellite-based and aerial-based imagery of the Earth is popular among government and commercial entities. One of the many applications of such imagery is for shallow water bathymetry. Bathymetry is the study of the underwater depth of bodies of water, such as oceans, seas, or lakes. Bathymetric information can be used to make bathymetric charts or maps for navigation purposes, as well as for many other uses.

While other methods are possible, there are three primary means for determining the depth at various points in a body of water. The first is beam sounding (also known as echosounding or SONAR), typically performed from a boat. This method is highly accurate but is the most expensive, costing in the range of $5,000 per square kilometer of area for which the depth is determined. The second method involves laser ranging (LIDAR), typically performed from an aircraft. This method is less accurate than, but also less expensive than, beam sounding, costing in the range of $2,000 per square kilometer of area for which the depth is determined. The third method involves analyzing overhead or satellite imagery to determine depth. This method has been the least accurate of the three methods and it is only effective for relatively shallow depths (e.g., down to 30 meters), and only for water clarity between clear and relatively turbid, but it is the least expensive of the three methods, costing in the range of $150 per square kilometer of area for which the depth is determined.

Typically, bathymetry from satellite imagery is performed by comparing the relative absorption of light in different color bands (e.g., green, blue, and coastal blue (e.g., bands in the range of 400-500 nanometers and thereabouts). The absorption of light by water causes the shallow water depth limitation for satellite imagery techniques. Furthermore, imaging is typically only performed in daylight. Also, satellite imagery is limited to conditions where the water is relatively clear, as the image sensors to a large extent see much like humans do. It would be desirable to increase the accuracy of bathymetry from overhead imagery.

It is against this background that the improvements disclosed herein have been developed.

BRIEF DESCRIPTION OF THE DRAWINGS

The disclosure herein is described with reference to the following drawings, wherein like reference numbers denote substantially similar elements.

DETAILED DESCRIPTION

Figure 1:
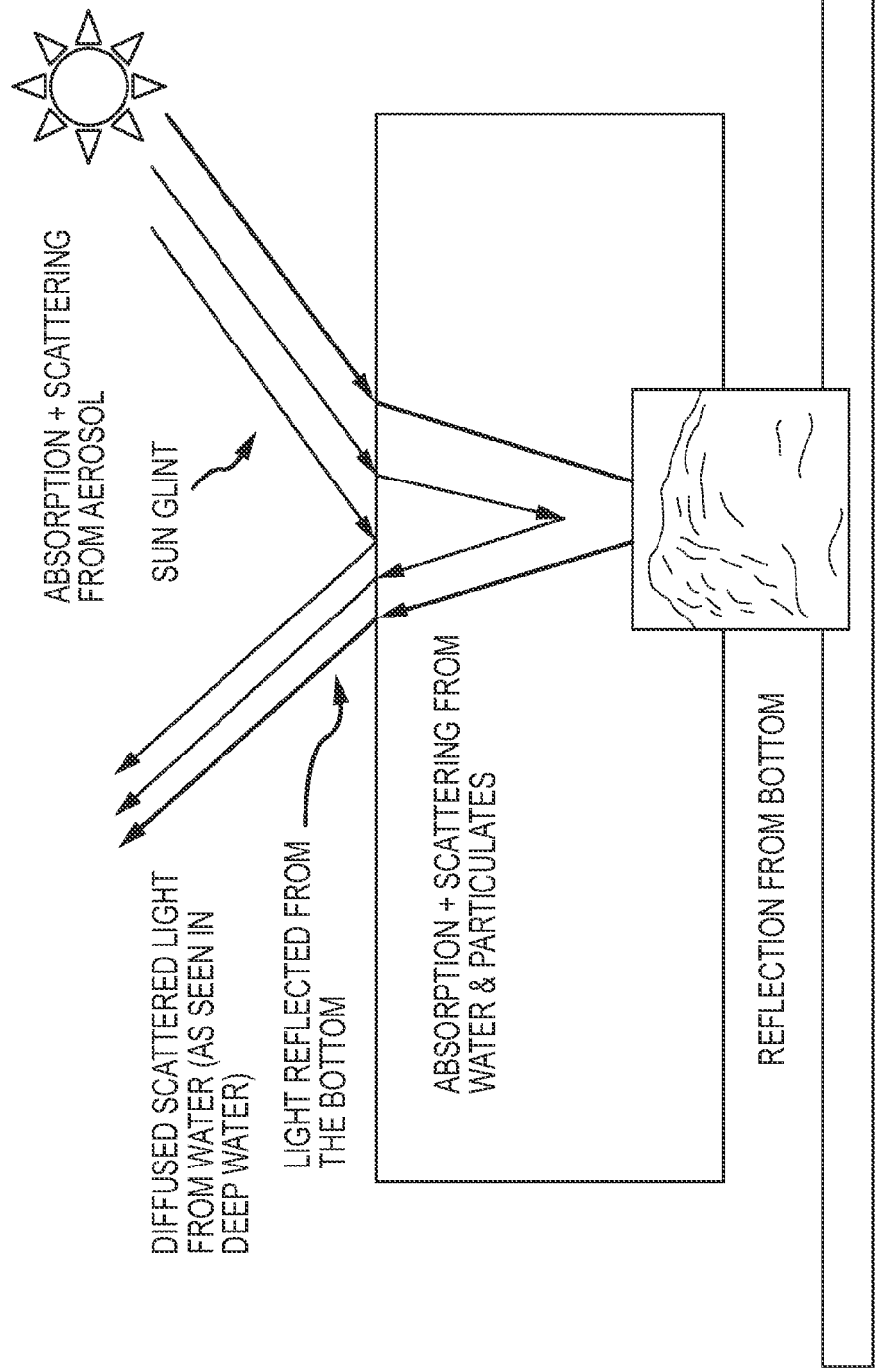
FIG. 1 is a depiction of an imaging satellite receiving sunlight redirected from a body of water.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

FIG. 1 shows light from the sun being reflected or scattered toward an imaging satellite. The reflected light is a combination of light reflected/scattered from (1) the atmosphere, (2) the water surface, (3) intermediate positions in the body of water either from the water itself or from particulates, and (4) the bottom surface of the body of water.

Spectral techniques for bathymetry are relatively new, as it is only recently that sufficiently high resolution satellite image data has been available to perform useful bathymetry from satellite image data. The spectral techniques can include looking at the amount of light absorbed in different spectral bands. Further, different bottom types absorb and reflect different spectral bands differently. A numerical match can be performed by comparing the spectral response to known spectral responses for various bottom types stored in a database.

Figure 5:
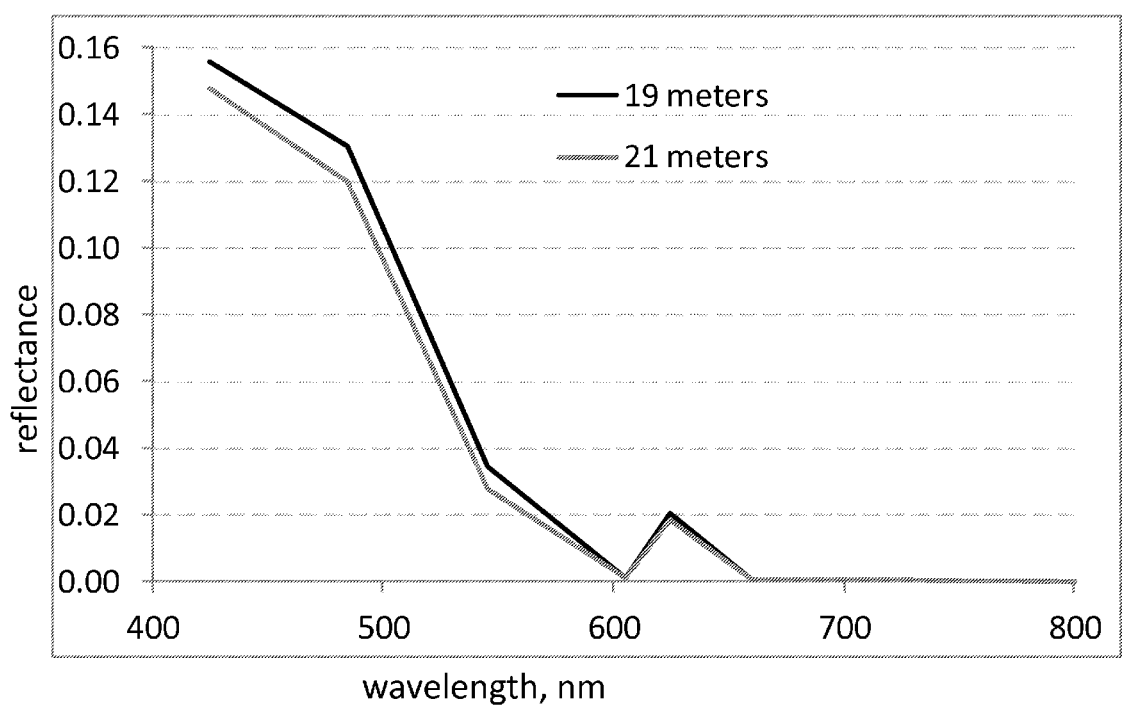
FIG. 5 is a graph of the absolute reflectance across the 400-800 nanometer range for water with a sandy bottom at depths of 19 meters and 21 meters.

FIG. 5 shows an example of a different spectral signature for an area of interest in a body of water at a 19-meter depth versus water at a 21-meter depth, in each case with the body of water having a bottom surface of sand. As can be seen, for water at these depths, the absolute reflectance at wavelengths above 600-650 nanometers is negligible. On the other hand, the reflectance in the coastal and blue bands (400-500 nanometers) is still greater than 10%. A close inspection of the graphs shows a slightly higher reflectance in the lower wavelength bands for 19-meter deep water as compared to 21-meter deep water.

Satellite imaging bathymetry involving looking at the absorption of sunlight in different spectral bands can have significant amount of error due to (1) aerosols in the atmosphere (and/or inaccurate atmospheric compensation algorithms intended to remove that effect), (2) low signal provided to the satellite from deeper water depths, and (3) low signal provided to the satellite from dark objects (e.g., sea grasses, algae, or other surface bottom types). In general, there are many unknown variables to be solved for in the process of deriving the depth from satellite imagery, typically more than the number of uncorrelated measurements (i.e. spectral bands). Such variables are: water depth, bottom reflectance at each spectral band, and one or more parameters describing water optical parameters. Since there are more unknown variables than uncorrelated measurements, the derivation process is highly under determined, leading to poor water depth estimates. To overcome this problem, a solution is proposed which combines traditional spectral (referred to later as radiometric) measurements, with stereo measurements, or any other measurements providing additional information about the state of the benthic habitat. Such additional information can be the a priori knowledge of the bottom type, previously recorded bottom depth, or a bottom depth collected at coarser resolution that the native imagery.

These spectral techniques can be improved by using Optimal Estimation techniques that have never been previously used in bathymetry. Optimal Estimation can include a particular form of regularized nonlinear least squares minimization based on Bayes theorem. Generally, Optimal Estimation algorithms employ statistical information to improve the results of the spectral techniques. The statistical information could include using some data already available. For example, in bathymetric applications, this could include combining a priori information with the current spectral image data. This could include recognizing that the bottom surface is of a particular type (e.g., largely sand with some rocks and coral). Or it could include recognizing that, at a particular geographic location, a particular bottom surface is (or surfaces are) most likely.

It could also include segmentation—drawing polygons around relatively uniform areas. In this manner, areas in the image with similar water depth can be grouped together. For example, a polygon or other type of boundary line could be drawn around an area that appears to have a sandy bottom. Similarly, a polygon or other type of boundary line could be drawn around an area that appears to have a seagrass bottom. Further, a polygon or other type of boundary line could be drawn around an area that appears to have a coral bottom.

As can be seen by typing "Belize great blue hole" into an online search engine and looking at the obtained image, a human can make some reasonable guesses as to bottom type from looking at such images, or any other color image of water at a shoreline.

Further, imposing a Continuity Constraint on the determined water depth of neighboring pixels can improve the accuracy of the results. The raw data from the spectral techniques can be very noisy because of relatively low signal-to-noise ratio over water (typically less that 100), and noise due to waves and sun/sky glint. By employing a constraint on the amount by which the water depth can vary from pixel to pixel, the accuracy is improved. In one example, image pixels each correspond to a square ground area of two meters per side. A simple example of a reasonable constraint on the maximum pixel-to-pixel variation in ground depth might be somewhere in the range of 0.3 to 1 meter. More complex constraints are also envisioned.

Of course, the accuracy of the results from any satellite bathymetric technique can be determined in one manner by comparing the results for a particular location in a particular body of water to a "ground truth" which in one case might be data from beam sounding techniques. It has been discovered that the Continuity Constraint approach provides an improvement in accuracy over older techniques such as applying a low pass filter.

Another technique for improving the accuracy of satellite bathymetry techniques is to use a "stereo" or "photogrammetric" approach. This includes obtaining more than one image of a particular geographic location in a particular body of water. With improvements in satellite imaging, it is now possible to capture multiple images of a single ground point from different viewing angles. Of course, the more than one image could also be captured at points in time further spaced apart as well. This may typically be two different images, but it could also be three, four, five or more images. The plurality of images can then be used to create a Digital Elevation Model (DEM) of the bottom surface of the body of water, similarly to how DEM is derived above the ground.

Determining depth information from the angular domain, using stereo photogrammetric techniques, is dependent in part upon the texture of the bottom surface of the body of water. It can be prone to errors over very smooth surfaces (e.g., featureless sandbanks). One advantage of using the angular domain is that it is not affected by atmospheric affects, and a priori knowledge of the surroundings and habitat are not needed.

Determining depth information from the temporal domain, can include obtaining frequent images (e.g. every 5 to 10 seconds) to provide information about wave motion. The longer wavelength regions of the light spectrum can be used to detect and monitor waves. Specifically, this may include looking at the red band. Because of the nature of this process, the spatial resolution of the depth information may not be as good as the spatial resolution of the spectral domain-based information and angular domain-based information. This technique can work well in all types of water, as long as there are moving waves.

It has further been discovered that one or more of these techniques (Optimal Estimation, Continuity Constraints, Spectral Domain Depth Determination, Angular Domain Depth Determination (e.g., Stereo Photogrammetry), and Time Domain Depth Determination (e.g., monitoring the movement of waves)) can be combined with each other to improve the accuracy of satellite bathymetry. Any combination of these techniques could be employed.

Each of these techniques is enhanced with highly-accurate pointing capability in overhead image remote sensing (e.g., satellite imagery). In one example, projections for DigitalGlobe's WORLDVIEW-3 (WV-3) satellite to be launched in August 2014, the pointing accuracy may be in the range of 2.2 to 2.5 meters, without noticeable random errors or drift within an image. Further Further, capturing multiple images of a single area on the ground in rapid succession is also a capability of DigitalGlobe's current and future satellites (e.g., WV-3 and its earlier generation satellite, WV-2). WV-2 has been used to image the same ground area at least 32 different times in a 300 second time period (and thus obtain 32 different images from slightly different capture angles).

Optimal estimation aims at finding parameters x which minimize the following cost function, and combines spectral, angular, and temporal information available during a single, or multiple observations of the same scene:

$$\Phi(x) = $$

$$(R_{rs}^{obs} - R_{rs}(x))^T S_R^{-1} (R_{rs}^{obs} - R_{rs}(x)) \quad \text{Observed and simulated reflectance, weighted with sensor noise.}$$

$$+ (L^{obs} - L(d))^T S_L^{-1} (L^{obs} - L(d)) \quad \text{Observed and simulated pointing direction, weighted with pointing uncertainty}$$

$$+ (x - x_A)^T S_A (x - x_A) \quad \text{A } priori \text{ information based on the knowledge of enviroment}$$

$$+ x^T \Omega_C x \quad \text{Multi-pixel continuity constraint } \Omega, \text{ smooths the solution}$$

The following symbols are used here:

x is a vector of variables which are being optimized to minimize the cost function; for each pixel, x is made up of the following components: water depth d, spectral reflectance of the bottom, parameters describing water optical properties (for example chlorophyll concentration).

d is the water depth.

R is observed/simulated remote sensing reflectance at all available bands; this represents the spectral component.

$S_R$ is noise-equivalent remote sensing reflectance (uncertainty of reflectance), as provided by satellite vendor, or derived by the user for a given scene.

L is observed/simulated ground position (bottom of the water column) in a Cartesian or equivalent coordinate system; this represents the photogrammetric/stereo component.

$S_L$ is uncertainty of measuring ground position, as provided by satellite vendor.

$x_A$ is a priori variable vector with the same physical meaning as defined in vector x; the a priori of depth (d) can be from previous in-situ measurements, or independently derived from the wave kinematics approach; depth derived from the wave-kinematic approach represents the temporal component.

$S_A$ is a priori covariance, and represents uncertainty of the a priori vector $x_A$.

$\Omega_C$ is the continuity covariance matrix, which couples nearby pixels to ensure that derived variables x are smooth across the entire image.

In order to minimize the cost function $\Phi(x)$ and find an optimal solution x, one can use an iterative optimization algorithm. Bound constraints on variables in x (e.g., surface reflectance bounded between 0 and 1) may be introduced to help the solver find the solution and/or keep the solution feasible. Because the cost function is nonlinear in the variable x, a constrained nonlinear optimization algorithm, such as a sequential quadratic programming (SQP) method or an interior point method, is needed. The cost function may be modified to instead return a vector of regularized residuals in order to work with a nonlinear least-squares solver, such as the Levenberg-Marquardt algorithm. Imposing continuity constants requires the use of sparse matrix solvers, since the continuity constraints operator $\Omega$ connects only nearby pixels. Simulated reflectance R(x) can be obtained from any radiative transfer code in water (for example Hydrolight by Curt Mobley), or can be computed semi-analytically. Simulated ground position L(d) can be computed using a sensor model, for instance provided by the satellite vendor.

Figure 6:
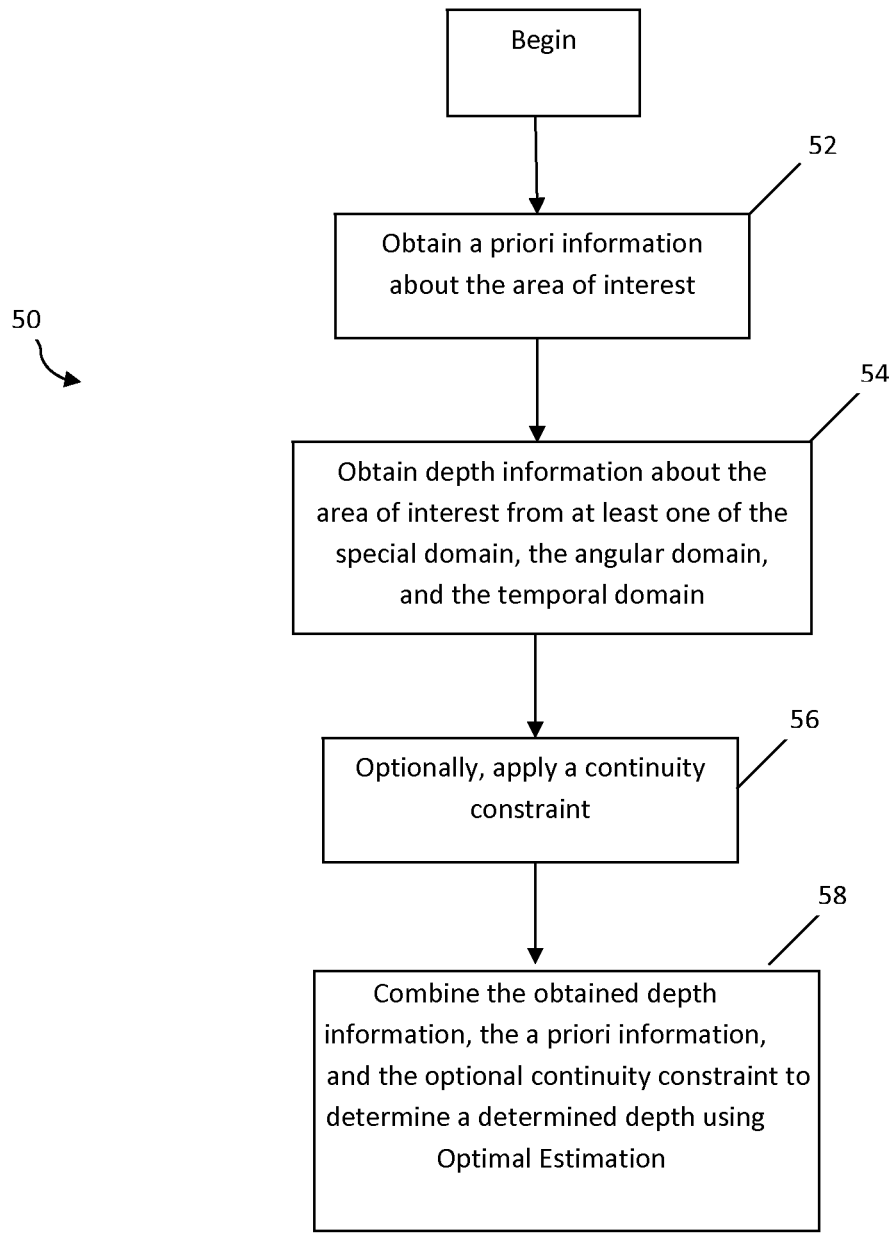
FIG. 6 is a flow chart of the process taught herein.

FIG. 6 is a flowchart 50 of the process generally taught herein. A priori information is obtained (52) about the area of interest. Depth information about the area of interest is obtained (54) from at least one of the spectral domain, the angular domain, and the temporal domain. Optionally, a Continuity Constraint is applied (56). These three portions of the process can be performed in any order. The obtained depth information, the a priori information, and the optional Continuity Constraint are combined (58) to determine a determine depth using Optimal Estimation.

It has been found that by combining these techniques, a significant improvement in the accuracy of water depth can be obtained. Accuracy of techniques utilizing only the spectral component is at best 10% of the water depth. So at water depths of 10 m, the error is at best 1 m. At 20 m depth, the error is about 2 m. In most cases, however, when the water is somewhat turbid or when the bottom features are dark, these errors are typically 20% of the actual water depth. It is expected that addition of angular measurements (i.e. stereo) to the spectral measurements can improve depths estimates to better than 10% over areas where these is significant spatial texture (for example dark sediments on white sand). Further improvements are expected with addition of a priori originating from the wave kinematic approach (i.e. the temporal domain), and finally from including the continuity constraint.

At this point, methods and techniques for performing such computer-implemented methods will be discussed. Generally, the techniques disclosed herein may be implemented on any suitable hardware or any suitable combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 2:
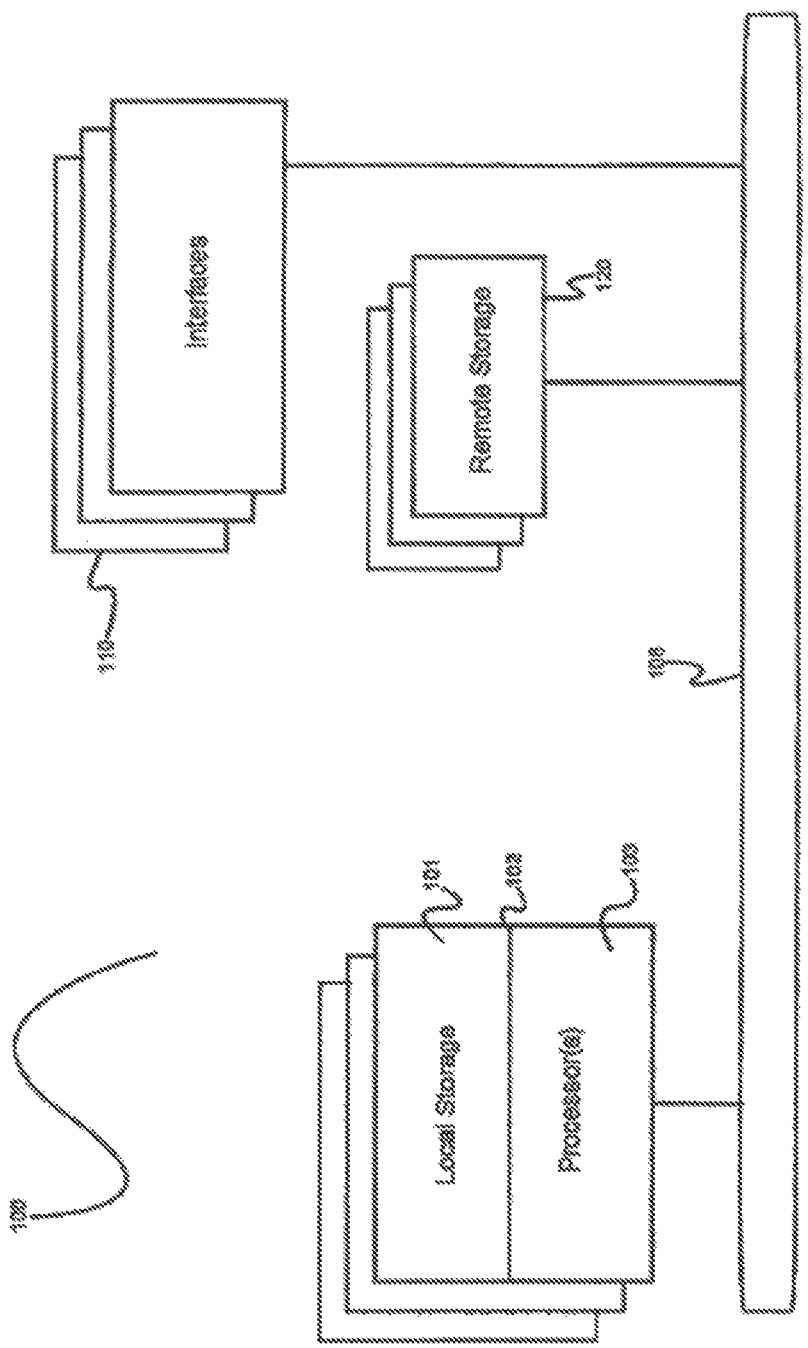
FIG. 2 is a block diagram illustrating an exemplary hardware architecture of a computing device used in an embodiment of the disclosure herein.

Referring now to FIG. 2, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110.

In at least one embodiment, CPU 102 may be caused to perform one or more of the different types of functions and/or operations under the control of software modules or components, which for example, may include an operating system and any appropriate applications software, drivers, and the like. CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 2 illustrates one specific architecture for a computing device 100 for implementing one or more of the embodiments described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 3:
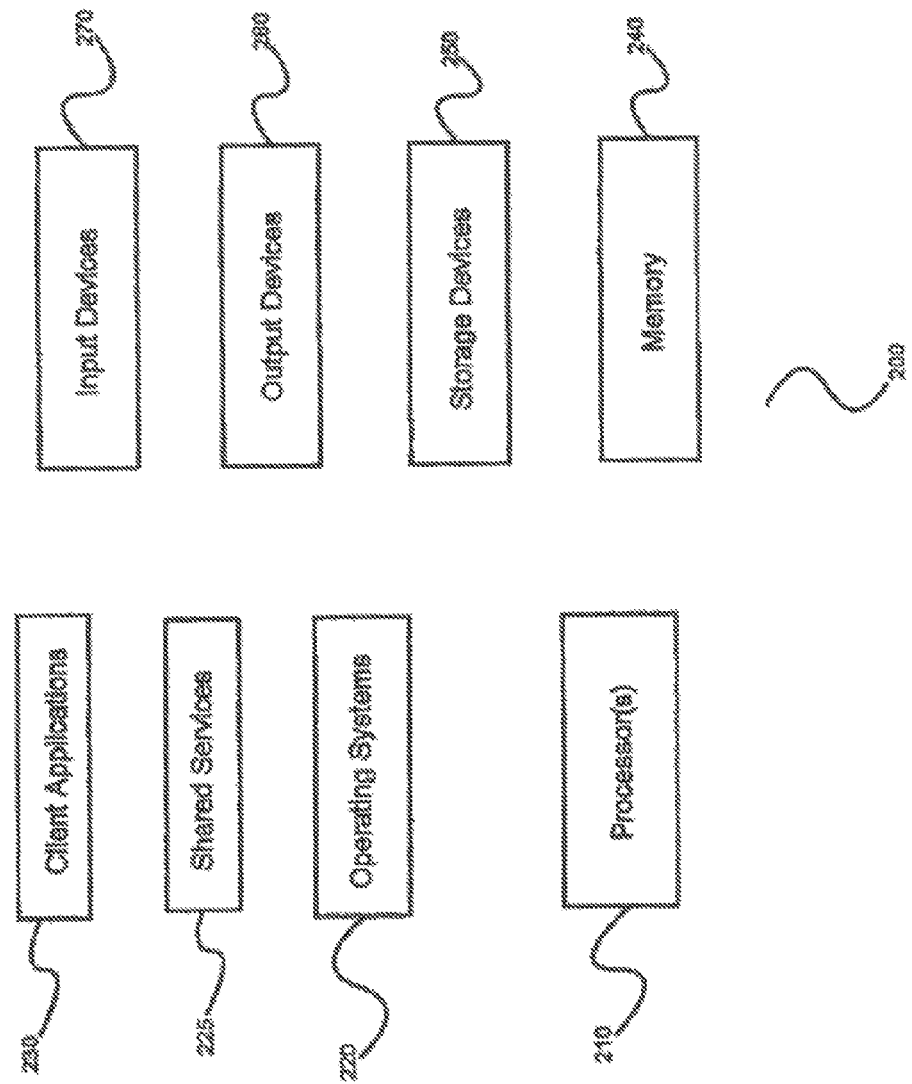
FIG. 3 is a block diagram illustrating an exemplary logical architecture for a client device, according to an embodiment of the disclosure herein.

In some embodiments, systems may be implemented on a standalone computing system. Referring now to FIG. 3, there is shown a block diagram depicting a typical exemplary architecture of one or more embodiments or components thereof on a standalone computing system. Computing device 200 includes processors 210 that may run software that carry out one or more functions or applications of embodiments, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 4:
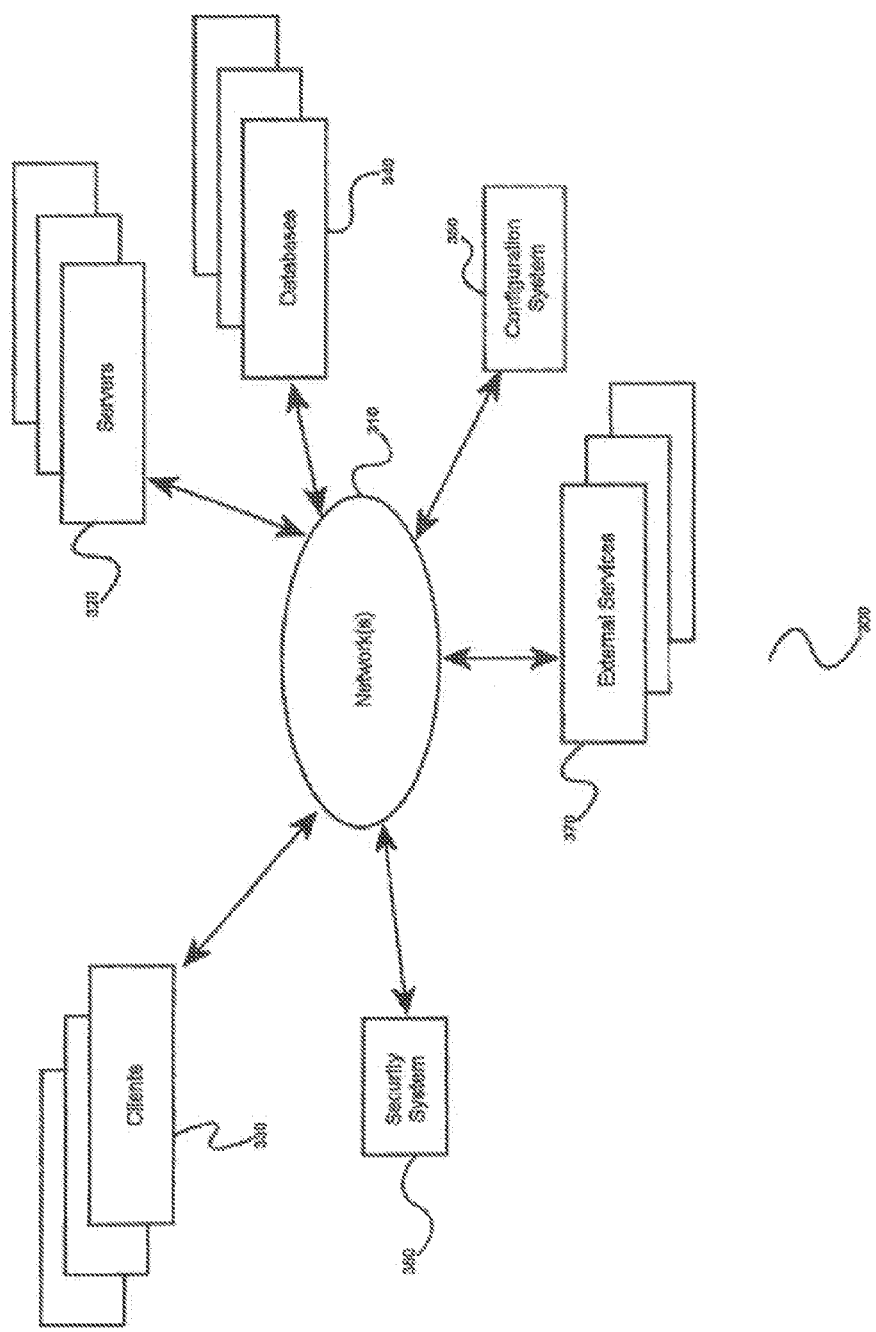
FIG. 4 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 4, there is shown a block diagram depicting an exemplary architecture for implementing at least a portion of a system according to an embodiment on a distributed computing network. According to the embodiment, any number of clients 330 may be provided. Each client 330 may run software for implementing client-side portions of the embodiments and clients may comprise a system 200 such as that illustrated in FIG. 3. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments, clients 330 or servers 320 (or both) may make use of one or more specialized services or appliances that may be deployed locally or remotely across one or more networks 310. For example, one or more databases 340 may be used or referred to by one or more embodiments. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 360 or configuration system 350 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

While the embodiments have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A computer-implemented method for performing bathymetry of an area of interest of a body of water, the method comprising:
    retrieving one or more overhead images of the area of interest;
    using at least one of a spectral domain, an angular domain, or a temporal domain to obtain one piece of water depth information of the area of interest from the one or more overhead images;
    obtaining a priori information about the area of interest, wherein the a priori information includes an estimate of the water depth, wherein the estimate of the water depth is made from a plurality of temporally spaced images, wherein the temporally spaced images include imagery in a wavelength band from which moving waves in the body of water can be detected, and wherein the movement of the waves is used to estimate water depth; and
    combining the one piece of water depth information of the area of interest with the a priori information of the area of interest to determine a water depth of the area of interest.

2. A method as defined in claim 1, wherein the combining includes using Optimal Estimation.

3. A method as defined in claim 1, wherein the combining includes using a least squares method.

4. A method as defined in claim 1, wherein the wavelength band includes wavelengths in the red portion of the light spectrum.

5. A method as defined in claim 1, wherein the a priori information can include an estimate of the type of bottom surface of the body of water in the area of interest.

6. A method as defined in claim 5, wherein the types of bottom surface can include one or more of sand, grass, or coral.

7. A method as defined in claim 1, wherein the a priori information can include an estimate of the water characteristics.

8. A method as defined in claim 1, wherein using the spectral domain to obtain water depth information includes comparing the relative absorption of light in each of a plurality of different spectral bands to obtain water depth.

9. A method as defined in claim 8, wherein the a priori information can include an estimate of the water depth.

10. A method as defined in claim 9, wherein the estimate of the water depth is made from a plurality of temporally spaced images.

11. A method as defined in claim 10, wherein the temporally spaced images include imagery in a wavelength band from which moving waves in the body of water can be detected, and wherein the movement of the waves is used to estimate water depth.

12. A method as defined in claim 11, wherein the wavelength band includes wavelengths in the red portion of the light spectrum.

13. A method as defined in claim 1, further including using either (1) an other one of the spectral domain, the angular domain, or the temporal domain, or (2) a Continuity Constraint to the water depth, to obtain an other piece of water depth information of the area of interest.

14. A method as defined in claim 13, wherein the one or more overhead images each includes an array of pixels of image data, and wherein the Continuity Constraint is applied to the determined water depth based on the variation of determined water depth of a given pixel to other pixels in the vicinity of the given pixel.

15. A computer-implemented method for performing bathymetry of an area of interest of a body of water, the method comprising:
   retrieving one or more overhead images of the area of interest;
   using a temporal domain to obtain one piece of water depth information of the area of interest from the one or more overhead images, wherein the one or more overhead images is a first image, and wherein using the temporal domain to obtain water depth information further includes:
      retrieving a second image of the area of interest of the body of water, the second image having been captured of the area of interest from a different capture angle than the first image, together the first image and the second image forming a stereoscopic image pair; and
      determining a water depth at various points in the area of interest based on the stereoscopic image pair;
   obtaining a priori information about the area of interest; and
   combining the one piece of water depth information of the area of interest with the a priori information of the area of interest to determine a water depth of the area of interest.

16. A method as defined in claim 15, wherein the combining includes using Optimal Estimation.

17. A method as defined in claim 15, wherein the combining includes using a least squares method.

18. A method as defined in claim 15, wherein the a priori information can include an estimate of the type of bottom surface of the body of water in the area of interest.

19. A method as defined in claim 18, wherein the types of bottom surface can include one or more of sand, grass, or coral.

20. A method as defined in claim 15, wherein the a priori information can include an estimate of the water characteristics.

* * * * *